United States Patent
Van Der Velde et al.

(10) Patent No.: US 10,893,461 B2
(45) Date of Patent: Jan. 12, 2021

(54) METHOD AND APPARATUS FOR PROCESSING TRANSMISSION OF UNATTENDED DATA TRAFFIC IN A WIRELESS COMMUNICATION SYSTEM

(71) Applicant: Samsung Electronics Co., Ltd., Gyeonggi-do (KR)

(72) Inventors: Himke Van Der Velde, Middlesex (GB); Gert-Jan Van Lieshout, Middlesex (GB); Jae-Hyuk Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 163 days.

(21) Appl. No.: 16/301,372

(22) PCT Filed: May 12, 2017

(86) PCT No.: PCT/KR2017/004983
§ 371 (c)(1),
(2) Date: Nov. 13, 2018

(87) PCT Pub. No.: WO2017/196147
PCT Pub. Date: Nov. 16, 2017

(65) Prior Publication Data
US 2020/0267626 A1    Aug. 20, 2020

(30) Foreign Application Priority Data
May 13, 2016   (GB) .................................... 1608494.9

(51) Int. Cl.
*H04W 4/00*     (2018.01)
*H04W 48/10*    (2009.01)
(Continued)

(52) U.S. Cl.
CPC ....... *H04W 48/10* (2013.01); *H04W 28/0247* (2013.01); *H04W 48/02* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 2009/0197589 A1* | 8/2009 | Kitazoe | H04W 76/25 455/422.1 |
| 2012/0020287 A1* | 1/2012 | Chin | H04W 60/00 370/328 |

(Continued)

OTHER PUBLICATIONS

PCT/ISA/210 Search Report dated PCT/KR2017/004983 (pp. 3).
(Continued)

*Primary Examiner* — Elisabeth Benoit Magloire
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method is provided for processing transmission of unattended data traffic (UDT) by a base station in a wireless communication system, the method comprises transmitting information indicating whether the transmission of UDT is barred, and barring the transmission of UDT based on the transmitted information.

12 Claims, 2 Drawing Sheets

(51) Int. Cl.
*H04W 28/02* (2009.01)
*H04W 48/02* (2009.01)
*H04W 72/12* (2009.01)

(56) References Cited

U.S. PATENT DOCUMENTS

| | | | |
|---|---|---|---|
| 2012/0309375 A1* | 12/2012 | Austin | H04W 4/50 |
| | | | 455/418 |
| 2013/0250908 A1* | 9/2013 | Bach | H04W 52/0206 |
| | | | 370/331 |
| 2014/0022904 A1 | 1/2014 | Amhad et al. | |
| 2014/0378125 A1* | 12/2014 | Bromell | H04W 60/02 |
| | | | 455/422.1 |
| 2015/0148036 A1* | 5/2015 | Grayson | H04W 60/02 |
| | | | 455/435.1 |
| 2016/0112896 A1 | 4/2016 | Karampatsis et al. | |
| 2016/0249266 A1* | 8/2016 | Kim | H04W 36/0007 |
| 2016/0302153 A1* | 10/2016 | Martin | H04L 69/28 |
| 2017/0302465 A1* | 10/2017 | Wang | H04W 76/20 |
| 2018/0070331 A1* | 3/2018 | Byun | H04W 36/0061 |

OTHER PUBLICATIONS

PCT/ISA/237 Written Opinion dated PCT/KR2017/004983 (pp. 7).
Verizon, Restricting Unattended Data Traffic, 3GPP TSG-RAN Meeting #93bis, R2-162884, Dubrovnik, Croatia, Apr. 11-15, 2016, pp. 7.
Verizon, Ericsson, Qualcomm, Access Restriction for Unattended Data Traffic, 3GPP TSG-RAN Meeting #93bis, R2-162835, Dubrovnik, Croatia, Apr. 11-15, 2016, pp. 11.
Huawei, ZTE, Options for handling unattended data traffic, 3GPP TSG RAN WG2 Meeting #93bis, R2-162788, Dubrovnik, Croatia, Apr. 11-15, 2016, pp. 6.

\* cited by examiner

[Fig. 1]
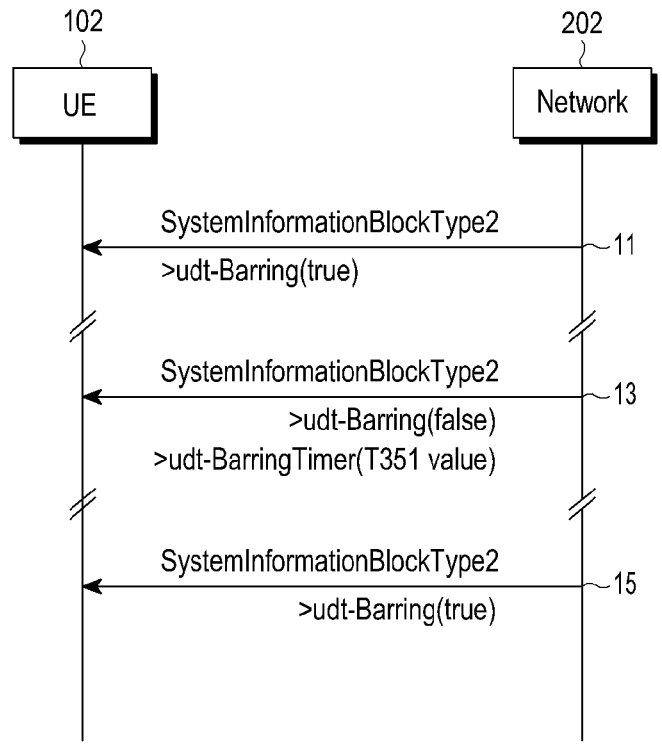
[Fig. 2]
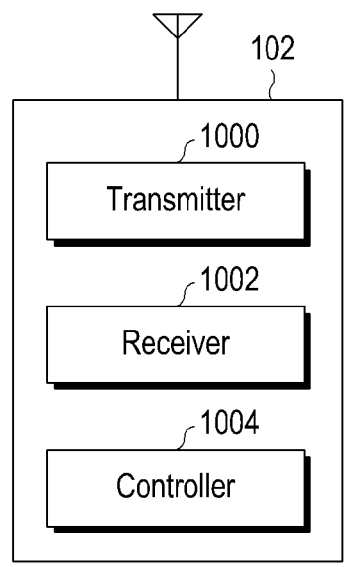

[Fig. 3]
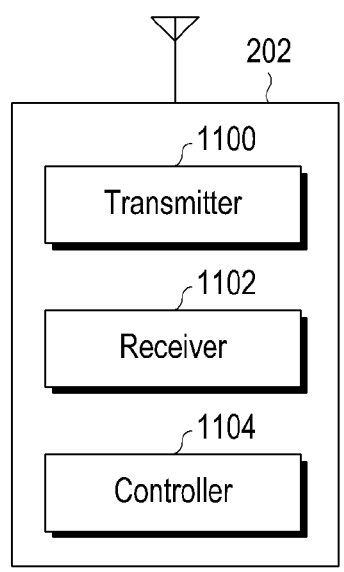

METHOD AND APPARATUS FOR PROCESSING TRANSMISSION OF UNATTENDED DATA TRAFFIC IN A WIRELESS COMMUNICATION SYSTEM

PRIORITY

This application is a National Phase Entry of International Application No. PCT/KR2017/004983, which was filed on May 12, 2017, and claims priority to Great Britain Patent Application No. 1608494.9, which was filed on May 13, 2016, the contents of each of which are incorporated herein by reference.

BACKGROUND

1. Field

The present disclosure relates to management of unattended data traffic (UDT) in a wireless communication system.

2. Description of the Related Art

In order to meet the demand for wireless data traffic having increased since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultra high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multipoint (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, the Internet is evolving from the human-centered connection network by which humans create and consume information to the Internet of Things (IoT) network by which information is communicated and processed between things or other distributed components. The Internet of Everything (IoE) technology may be an example of a combination of the Big data processing technology and the IoT technology through, e.g., a connection with a cloud server.

To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, healthcare, or smart appliance industry, or state-of-art medical services, through conversion or integration of existing IT technologies and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network as a Big data processing technique may be said to be an example of the convergence of the 5G and IoT technologies.

In the context of this application, "unattended data traffic", refers to data traffic whose transfer is not directly initiated by a user of a mobile device. As an example, if a user of a mobile device initiates or responds to a telephone call, or browses a website then this does not constitute unattended data. However, if an application ("app") requests or initiates an update without user involvement, then this constitutes unattended data.

In most circumstances, UDT does not pose any particular problem for the wireless communication system, since the data bandwidth occupied by UDT does not jeopardise other data traffic.

However, there can be situations where the presence of UDT on the network is undesirable and can interfere with the ability to convey more urgent or time-critical data. For instance, in a crowded sports stadium, rock concert, demonstration or the like where many more people are gathered in a space than are normally present, the capacity of any associated wireless communication system may be seriously constrained, meaning that the available bandwidth should be managed carefully to ensure that users experience an acceptable level of service. There are also situations, such as natural or man-made disasters where the available network capacity is constrained either due to an increase of people in a given area or a reduction in network capability due to the disaster.

SUMMARY

In such scenarios, there may generally be a need to prevent UDT from occupying bandwidth which could be better deployed for other data traffic.

The present disclosure addresses at least the above-mentioned problems and/or disadvantages and provides at least the advantages described below.

According to an aspect of the present disclosure, a method and apparatus are provided for efficiently processing transmission of unattended data traffic (UDT) in a wireless communication system.

In accordance with an aspect of the present disclosure, a method is provided for processing transmission of unattended data traffic (UDT) by a base station in a wireless communication system, the method comprises transmitting information indicating whether the transmission of UDT is barred, and barring the transmission of UDT based on the transmitted information.

In accordance with another aspect of the present disclosure, a base station is provided for processing transmission of unattended data traffic (UDT) in a wireless communication system, the base station comprises a transceiver configured to transmit or receive data, and a controller coupled with the transceiver and configured to transmit information indicating whether the transmission of UDT is barred, and bar the transmission of UDT based on the transmitted information.

In accordance with another aspect of the present disclosure, a method is provided for processing transmission of unattended data traffic (UDT) by a user equipment (UE) in a wireless communication system, the method comprises receiving, from a base station, information indicating whether the transmission of UDT is barred, and barring the transmission of UDT based on the received information.

In accordance with another aspect of the present disclosure, a user equipment (UE) is provided for processing transmission of unattended data traffic (UDT) by in a wireless communication system, the UE comprises a transceiver configured to transmit or receive data, and a controller coupled with the transceiver and configured to receive, from a base station, information indicating whether the transmission of UDT is barred, and bar the transmission of UDT based on the received information.

In accordance with an aspect of the present disclosure, a method is provided for barring transmission of unattended data traffic (UDT) in a wireless communication system, the method comprises broadcasting, from a base station of the wireless communication system, to one or more mobile terminals, information indicating that the transfer of unattended data is barred, wherein if the transmission of UDT is allowed after a period of barring, the one or more mobile terminals start a timer with a randomly selected value such that when the timer expires, UDT may be conveyed, and if the one or more mobile terminals have the timer running and receive a further indication barring UDT, then the timer is stopped.

In accordance with another aspect of the present disclosure, the information may be included in a system information block.

In accordance with another aspect of the present disclosure, the randomly selected value may be in the range zero to a maximum value and the maximum value may be set by the wireless communication system.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 1 illustrates message exchanges according to aspects of an embodiment of the disclosure;

FIG. 2 schematically illustrates the structure of a UE according to aspects of an embodiment of the disclosure; and FIG. 3 schematically illustrates the structure of an eNB according to aspects of an embodiment of the disclosure.

Throughout the drawings, like reference numerals may refer to like parts, components, and/or structures.

DETAILED DESCRIPTION

Various embodiments of the present disclosure will be described in detail below with reference to the accompanying drawings.

What is well known in the related art in the following description of the embodiments will be omitted for technical details that are not directly related to the present disclosure, in order to more clearly convey the subject matter of the present disclosure. For the same reason, in the accompanying drawings, some components may be exaggerated, omitted or shown schematically. In addition, the size of each component may not reflect its actual size. The same or corresponding components in the drawings are assigned the same reference numerals.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An evolved Node B (eNB), which is a network entity for communicating with a user equipment (UE), may be referred to as a base station (BS), a base transceiver station (BTS), a Node B (NB), an access point (AP), and the like. A UE, which is a network entity for communicating with an eNB, may be referred to as a device, a mobile station (MS), a mobile equipment (ME), a terminal and the like.

Although embodiments of the present disclosure can be used in an applicable wireless communication system, specific examples are given below in the context of 3GPP (3rd Generation Partnership Project) LTE (Long Term Evolution). The skilled person will appreciate that other networks may benefit from the underlying inventive concept.

If it is required to curtail the presence of UDT on the network, this may be done by modifying the system information block, specifically SIB2, which is broadcast from a given cell and which, amongst other items, gives mobile terminals or user equipment (UE) information about the accessibility of the cell (i.e. call barring). SIB2 is extended to include a specific bit (udt-Barring) which indicates whether upper layers are permitted to initiate connection establishment for transferring unattended data or are permitted to initiate actions related to the transfer of unattended data. Such an extension to SIB2 requires agreement and codification, but is a simple change to effect in practice.

If the udt-Barring bit is set, indicating that UDT is not permitted, it will not be possible to convey UDT via that particular cell for as long as the bit is set.

In the event that the bit changes, indicating that UDT is then permitted, the UE will start a timer. The timer may be set differently for each cell or each mobile device.

In a preferred embodiment, the UE will start the timer with a value which is randomly distributed in the time range: 0 to a time (udt-BarringTime) which is set by the network (for example, base station, MME, etc) or pre-programmed into the UE. When this timer expires, then the bar on UDT is removed and the conveyance of UDT can begin. The reason for providing the timer with a random countdown time is to stagger the resumption of UDT amongst a potentially large number of UEs who would otherwise all begin conveying UDT simultaneously, which would cause a large strain on network resources.

FIG. 1 illustrates a method of barring transmission of UDT according to aspects of an embodiment of the disclosure. FIG. 1 shows a representation of the message exchanges associated with an embodiment of the disclosure, passing between a UE or mobile terminal 102 and network 202, represented by an eNB.

Referring to FIG. 1, In step 11, The network 202 transmits an SIB2 message which includes the udt-Barring bit (that is, information associated with UDT barring). If the udt-Barring bit is set to "true", for example, then UDT barring is in force and the mobile terminals in that particular cell are prohibited from conveying UDT. In this case, upper layers of the UE should not then initiate a connection merely for transferring unattended data or take action related to the transfer of unattended data.

In step 13, Next, some time later, the UDT barring is removed and the network may reset the udt-Barring bit to "false", indicating that unattended data may be transferred again. At the same time, the UE starts a udt barring timer (that is, timer associated with UDT barring) (for example, designated T351). Upon expiry of the timer, the UE stops the UDT barring and unattended data may be transferred once more.

In step 15, the final message illustrates a particular problem with known systems in the prior art. Presently, if the network indicates that the UDT barring is no longer in force, but one or more UEs are in a state where the timer (T351) is running, but the network 202 again reinstates the UDT barring while the timer (T351) is running, upon expiry of the timer (T351), the UE would switch into a state where UDT conveyance is possible, which is clearly not the intention.

As such, on the UE receiving information indicating that the UDT barring is in force, any timer which is running should be stopped to ensure that the UDT barring is not inadvertently avoided.

The same would apply if the UE reselects a cell where UDT is barred.

FIG. 2 provides a schematic diagram of the structure of a UE 102 which is arranged to operate in accordance with the examples of the present disclosure described above. The UE includes a transmitter 1000 configured to transmit user and control data to an eNB; a receiver 1002 configured to receive user and control data from the eNB, such as information included in SIB2, including the udt-Barring bit; and a controller 1004 configured to control the transmitter 1000 and receiver 1002 and to perform processing associated with the UDT barring and to operate the timer referred to previously as shown in the embodiment of FIG. 1.

FIG. 3 provides a schematic diagram of the structure of an eNB 202 or base station which is arranged to operate in accordance with the examples of the present disclosure described above. The eNB includes a transmitter 1100 configured to transmit user and control data to the UE, such as SIB2 information; a receiver 1102 configured to receive user and control data from the UE; and a controller 1104 configured to control the transmitter 1100 and receiver 1102 and to perform processing associated with the UDT barring as shown in the embodiment of FIG. 1.

Although in FIGS. 2 and 3 the transmitter, receiver, and controller have been illustrated as separate elements, any single element or plurality of elements which provide equivalent functionality may be used to implement the examples of the present disclosure described above.

Embodiments of the disclosure are able to selectively control the flow of UDT in a wireless communication system. By ensuring that the timer referred to is stopped in the circumstances set out, it is possible to ensure that UEs assume the correct UDT barring state.

The above-described aspects of the present disclosure can be implemented in the form of computer-executable program commands stored in a non-transitory computer-readable storage medium. The non-transitory computer-readable storage medium is a data storage device capable of storing the data readable by a computer system. Examples of the computer-readable storage medium include Read-Only Memory (ROM), Random-Access Memory (RAM), Compact Disc (CD) ROM, magnetic tape, floppy disc, optical data storage devices, and carrier waves (such as data transmission through Internet). The non-transitory computer-readable storage medium may be distributed to the computer systems connected through a network such that the computer-readable codes are stored and executed in a distributed manner. The functional programs, codes, and code segments for implementing the present disclosure can be interpreted by the programmers skilled in the art.

The apparatus and method according to an embodiment of the present disclosure can be implemented by hardware, software, or a combination thereof. Certain software can be stored in volatile or nonvolatile storage device such as ROM, memory such as RAM, memory chip, and integrated circuit, and storage media capable of recordable optically or magnetically or readable by machines (e.g., computer) such as CD, Digital Versatile Disc (DVD), magnetic disc, and magnetic tape. The method according to an embodiment of the present disclosure can be implemented by a computer or a mobile terminal including a controller and a memory, and the memory is a storage medium capable of storing and reading the program or programs including the instructions implementing the various embodiments of the present disclosure.

Thus the present disclosure includes the programs including the codes for implementing the apparatus and method specified in a claim of the present disclosure and a non-transitory machine-readable (computer-readable) storage media capable of storing the program and reading the program.

The apparatus according to an embodiment of the present disclosure may receive the program from a program providing device connected through a wired or wireless link and store the received program. The program providing device may include a program including instructions executing a pre-configured contents protection method, a memory for storing information necessary for the contents protection method, a communication unit for performing wired or wireless communication with a graphic processing device, and a controller for transmitting a request of the graphic processing device or the corresponding program automatically to the transceiver.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

The invention claimed is:

1. A method for processing transmission of unattended data traffic (UDT) by a base station in a wireless communication system, the method comprising:
   transmitting, to a user equipment (UE), information indicating restriction of the transmission of the UDT and time information associated with the transmission of the UDT; and
   restricting the transmission of the UDT based on the transmitted information indicating restriction of the transmission of the UDT and the transmitted time information,
   initiating the transmission of the UDT in case that a timer indicated by the time information is expired, the timer being set based on the time information and a random value.

2. The method of claim 1, wherein the information are included in a system information block broadcasted by the base station.

3. The method of claim 2, wherein the system information block is SIB2.

4. A base station for processing transmission of unattended data traffic (UDT) in a wireless communication system, the base station comprising:
   a transceiver; and
   a processor configured to:
      control the transceiver to transmit, to a user equipment (UE), information indicating restriction of the transmission of the UDT and time information associated with the transmission of the UDT,
      control the transceiver to restrict the transmission of the UDT based on the transmitted information indicating restriction of the transmission of the UDT and the transmitted time information, and
      control the transceiver to initiate the transmission of the UDT in case that a timer indicated by the time information is expired, the timer being set based on the time information and a random value.

5. The base station of claim 4, wherein the information are included in a system information block broadcasted by the base station.

6. The base station of claim 5, wherein the system information block is SIB2.

7. A method for processing transmission of unattended data traffic (UDT) by a user equipment (UE) in a wireless communication system, the method comprising:
   receiving, from a base station, information indicating restriction of the transmission of the UDT and time information associated with the transmission of the UDT;
   restricting the transmission of the UDT based on the received information indicating restriction of the transmission of the UDT and the received time information; and
   initiating the reception of the UDT in case that a timer indicated by the time information is expired, the timer being set based on the time information and a random value.

8. The method of claim 7, wherein the information are included in a system information block broadcasted by the base station.

9. The method of claim 8, wherein the system information block is SIB2.

10. A user equipment (UE) for processing transmission of unattended data traffic (UDT) by in a wireless communication system, the UE comprising:
    a transceiver; and
    a controller configured to:
       control the transceiver to receive, from a base station, information indicating restriction of the transmission of the UDT and time information associated with the transmission of the UDT,
       control the transceiver to restrict the transmission of the UDT based on the received information indicating restriction of the transmission of the UDT and the received time information, and
       control the transceiver to initiate the reception of the UDT in case that a timer indicated by the time information is expired, the timer being set based on the time information and a random value.

11. The UE of claim 10, wherein the information are included in a system information block broadcasted by the base station.

12. The UE of claim 11, wherein the system information block is SIB2.

* * * * *